Figure 20:
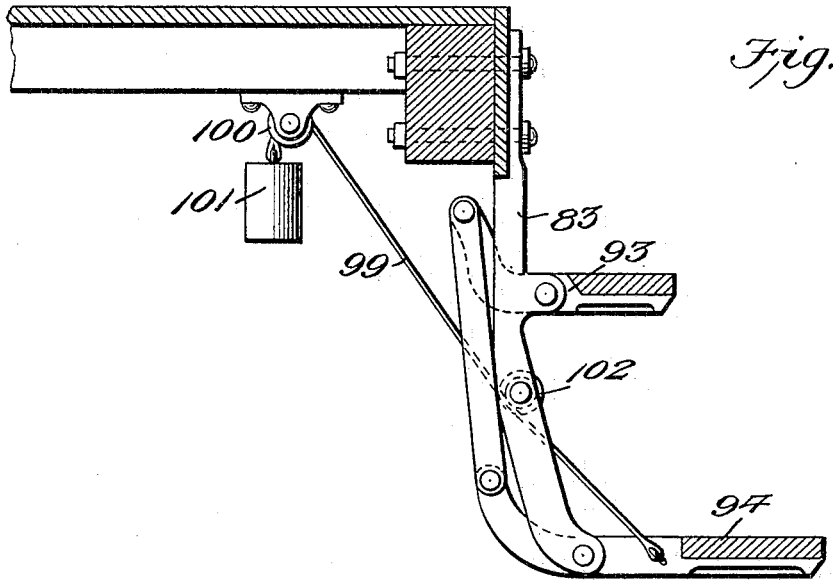

No. 775,366. PATENTED NOV. 22, 1904.
J. A. KRATZ.
FOLDING CAR STEP.
APPLICATION FILED APR. 3, 1903.
NO MODEL. 10 SHEETS—SHEET 1.
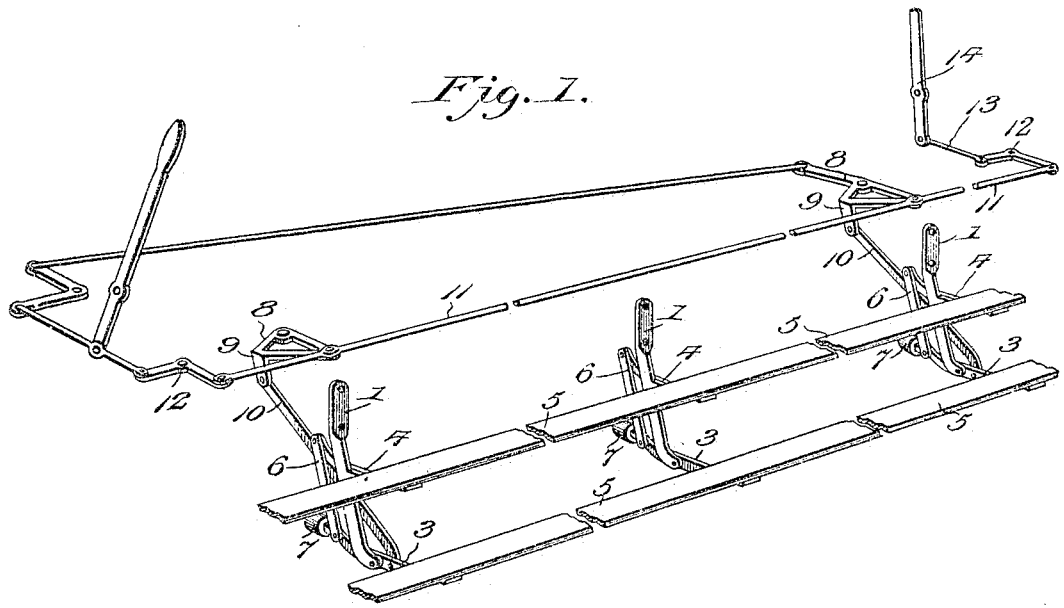
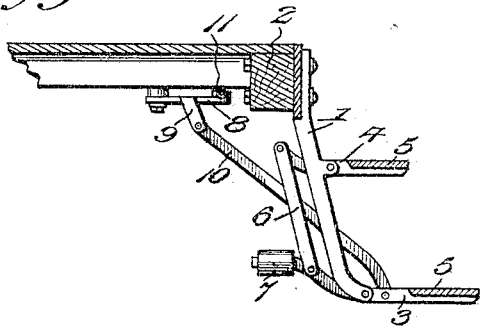
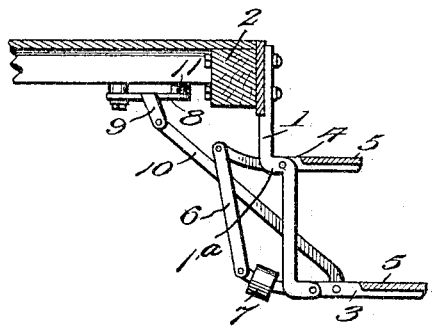
Inventor
John A. Kratz
Witnesses
Edwin G. McKee
Chas. S. Hoyer
By Victor J. Evans
Attorney

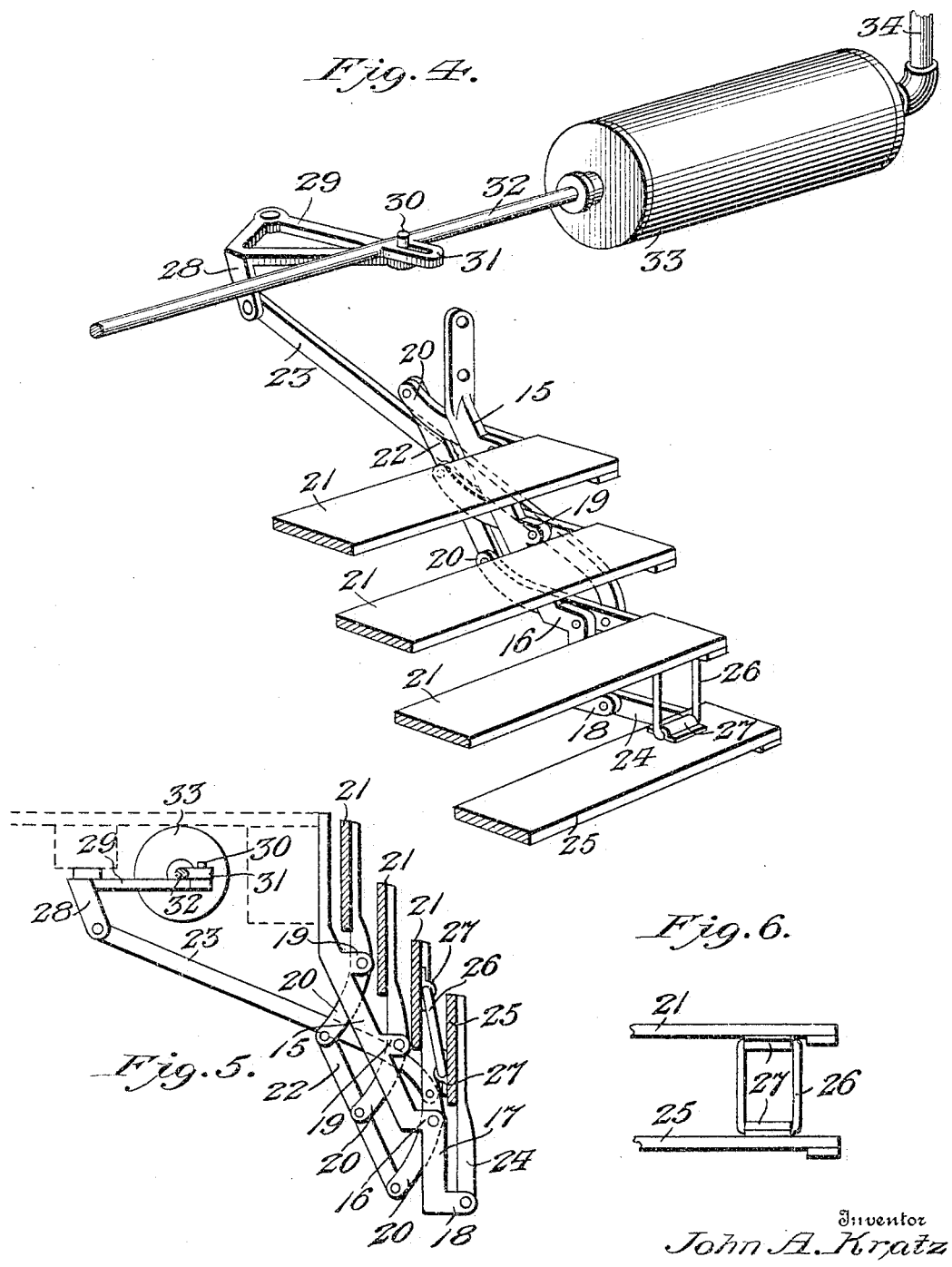

No. 775,366. PATENTED NOV. 22, 1904.
J. A. KRATZ.
FOLDING CAR STEP.
APPLICATION FILED APR. 3, 1903.
NO MODEL. 10 SHEETS—SHEET 3.
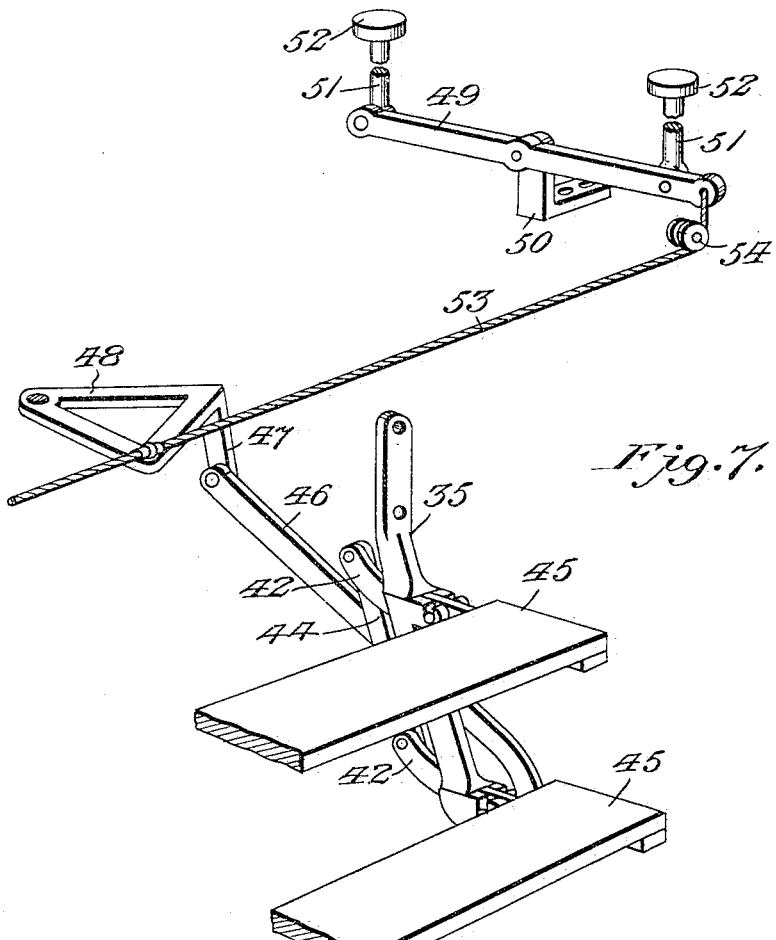
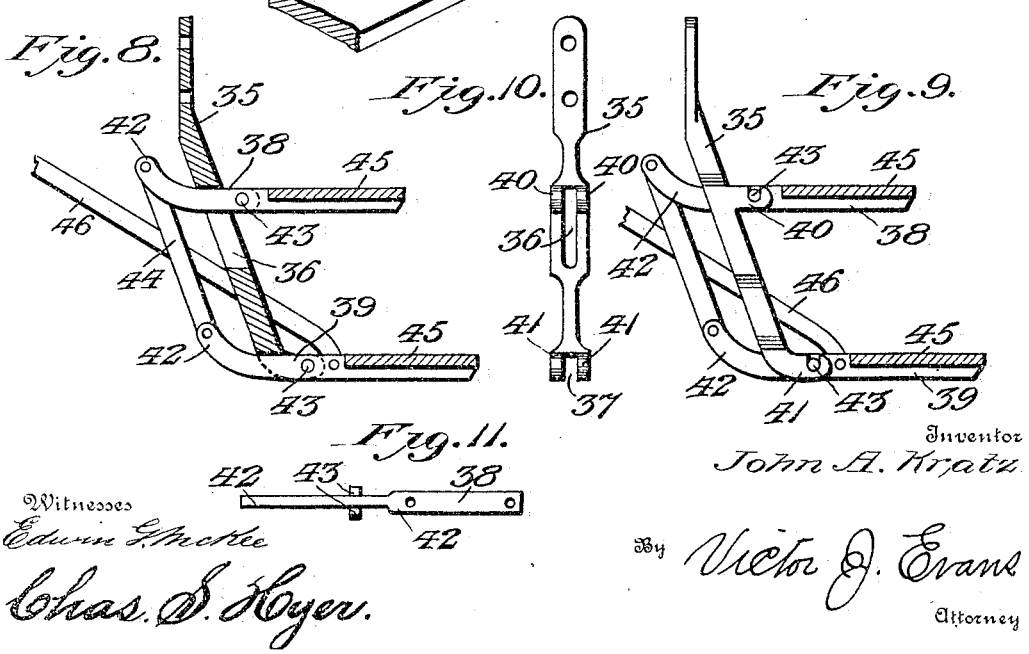
Witnesses
Edwin G. McKee
Chas. S. Hyer.
Inventor
John A. Kratz
By Victor J. Evans
Attorney No. 775,366. PATENTED NOV. 22, 1904.
J. A. KRATZ.
FOLDING CAR STEP.
APPLICATION FILED APR. 3, 1903.
NO MODEL. 10 SHEETS—SHEET 4.
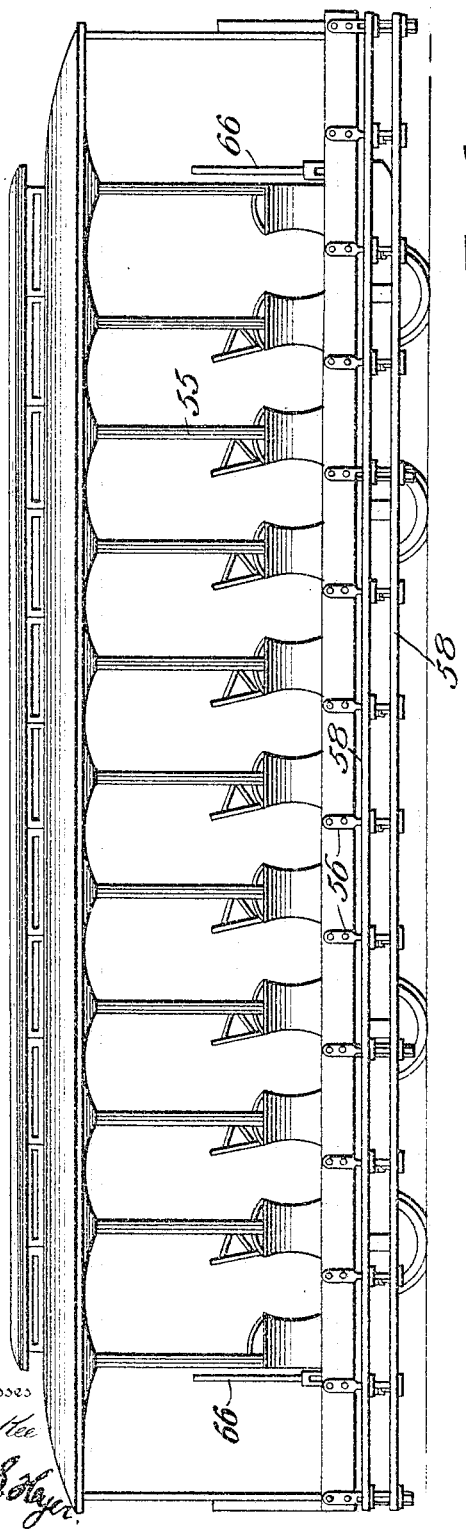
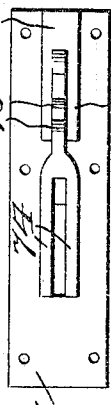
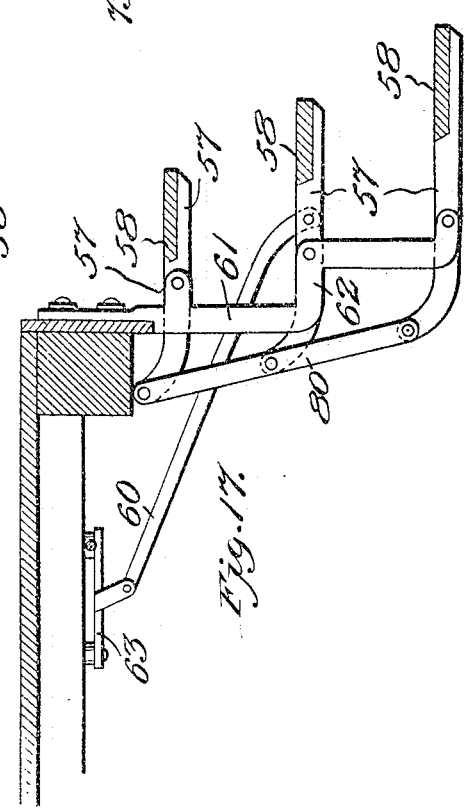
Inventor
John A. Kratz
By Victor J. Evans
Attorney
Witnesses
E. F. McKee
Chas. B. Hays Jr.

No. 775,366. PATENTED NOV. 22, 1904.
J. A. KRATZ.
FOLDING CAR STEP.
APPLICATION FILED APR. 3, 1903.
NO MODEL. 10 SHEETS—SHEET 5.
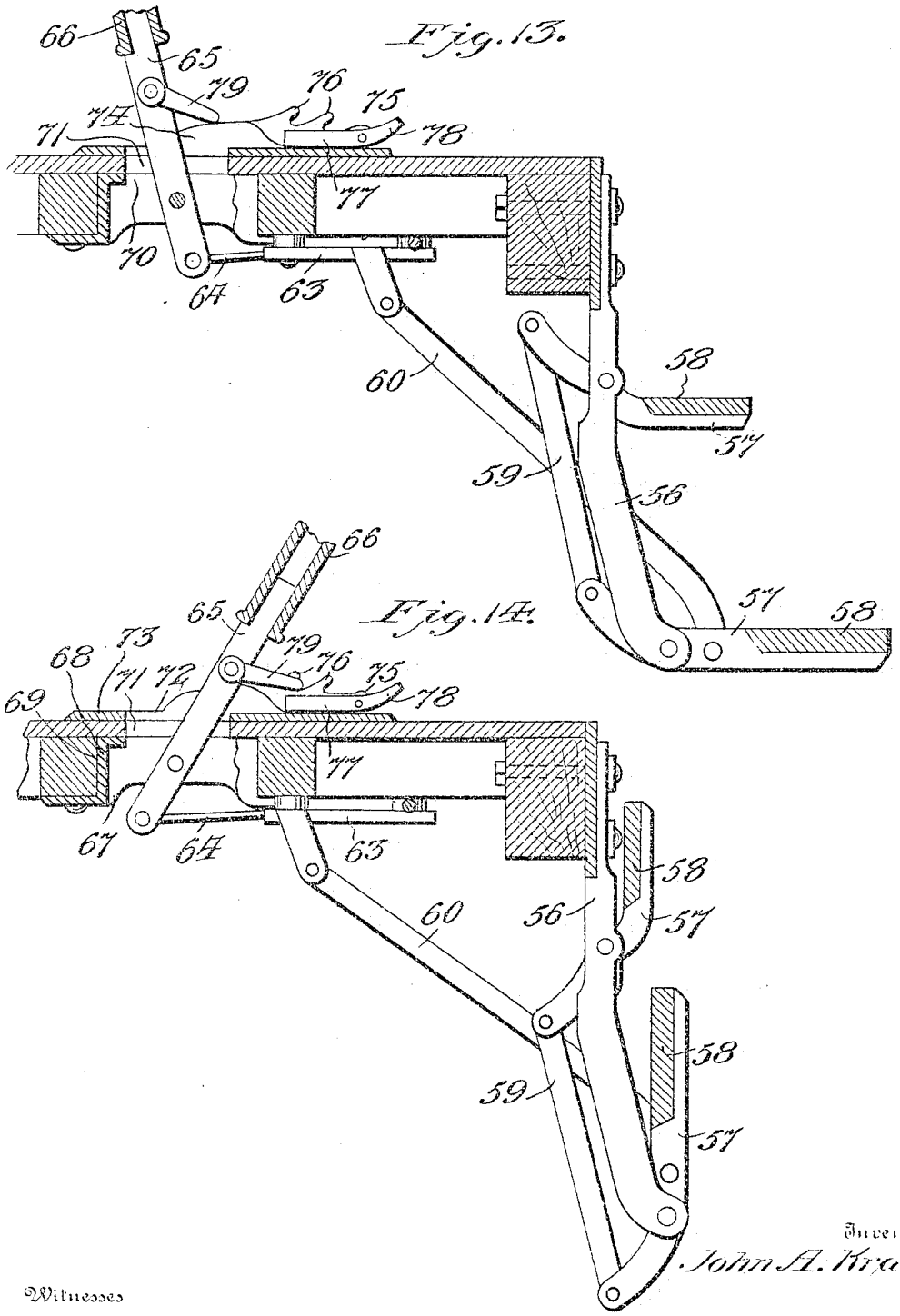
Witnesses
Edwin G. McKee
Chas. S. Hyer
Inventor
John A. Kratz
By Victor J. Evans
Attorney No. 775,366. PATENTED NOV. 22, 1904.
J. A. KRATZ.
FOLDING CAR STEP.
APPLICATION FILED APR. 3, 1903.
NO MODEL. 10 SHEETS—SHEET 6.
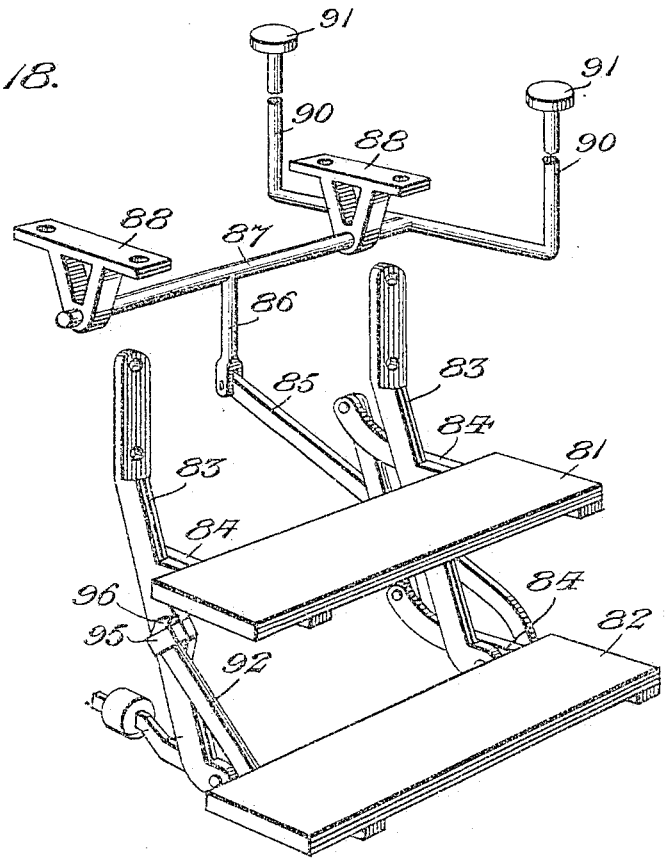
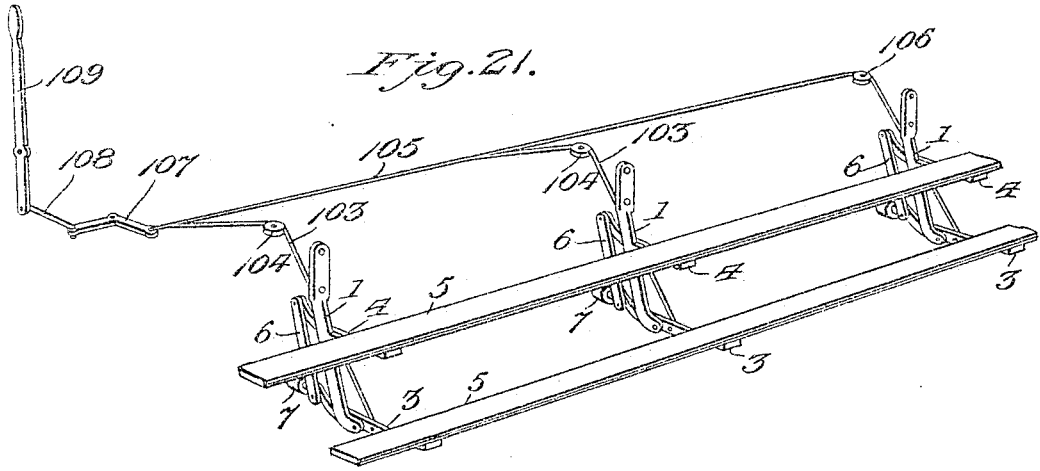
Witnesses
Edwin G. McKee
Chas. S. Hyer
Inventor
John A. Kratz
By Victor J. Evans
Attorney No. 775,366. PATENTED NOV. 22, 1904.
J. A. KRATZ.
FOLDING CAR STEP.
APPLICATION FILED APR. 3, 1903.
NO MODEL. 10 SHEETS—SHEET 7.

Witnesses
Edwin G. McKee
Chas. S. Hoyer

Inventor
John A. Kratz

By Victor J. Evans
Attorney

No. 775,366. PATENTED NOV. 22, 1904.
J. A. KRATZ.
FOLDING CAR STEP.
APPLICATION FILED APR. 3, 1903.
NO MODEL. 10 SHEETS—SHEET 8.
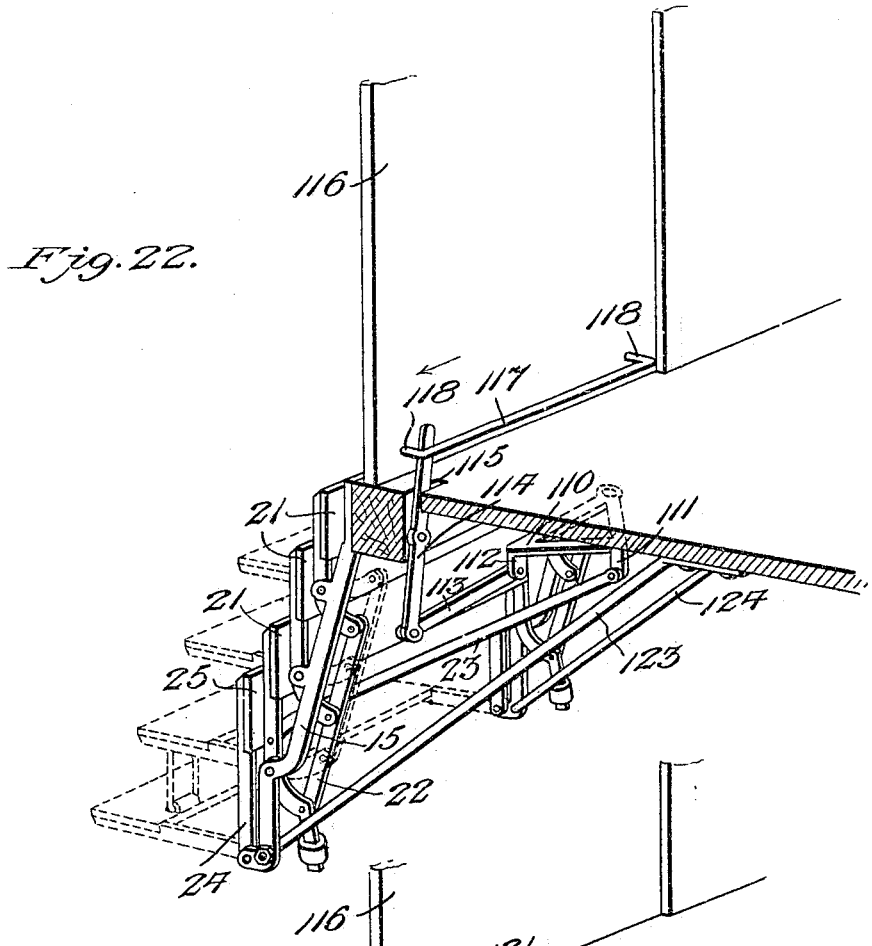
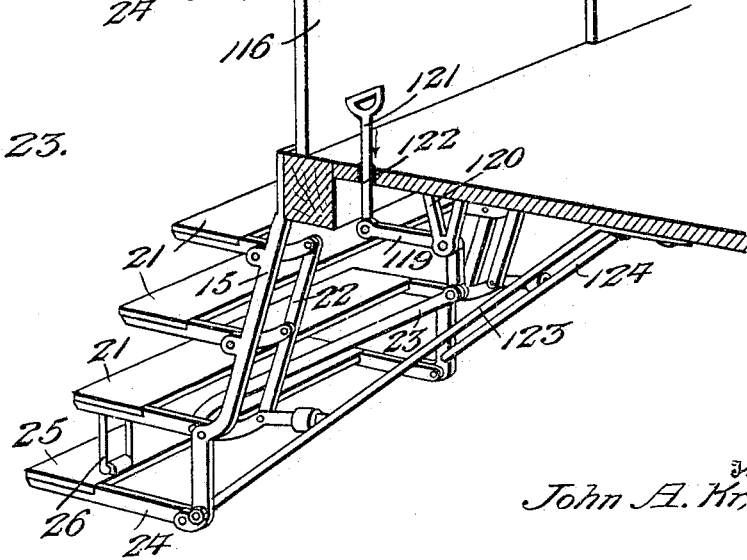
Witnesses
Edwin G. McKee
Chas. S. Hyer
Inventor
John A. Kratz
By Victor J. Evans
Attorney No. 775,366. PATENTED NOV. 22, 1904.
J. A. KRATZ.
FOLDING CAR STEP.
APPLICATION FILED APR. 3, 1903.
NO MODEL. 10 SHEETS—SHEET 9.
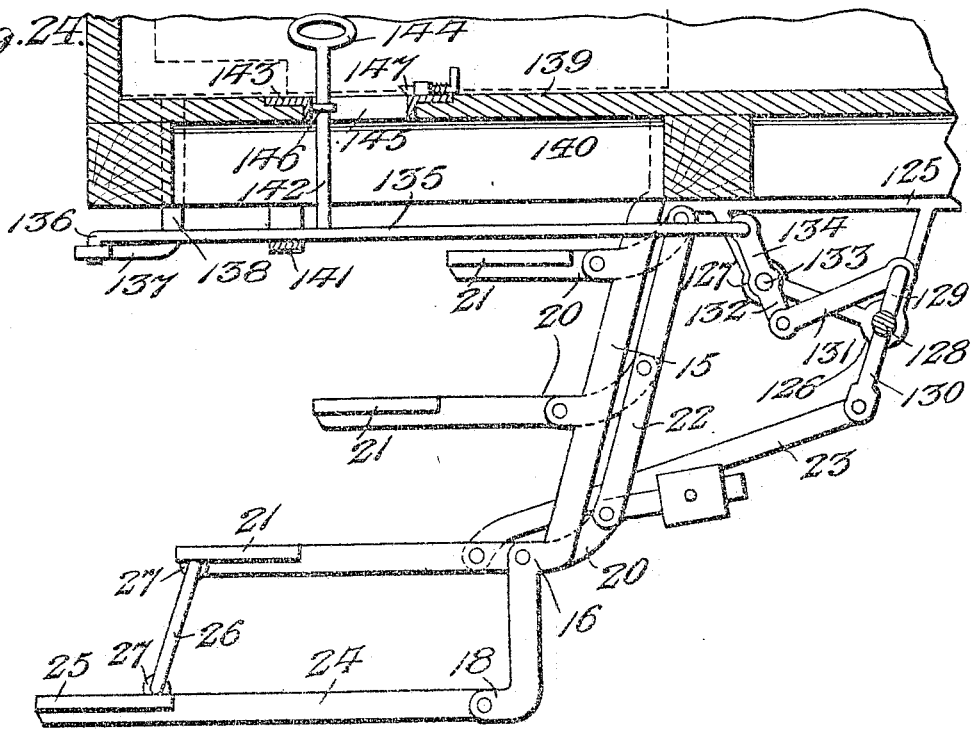
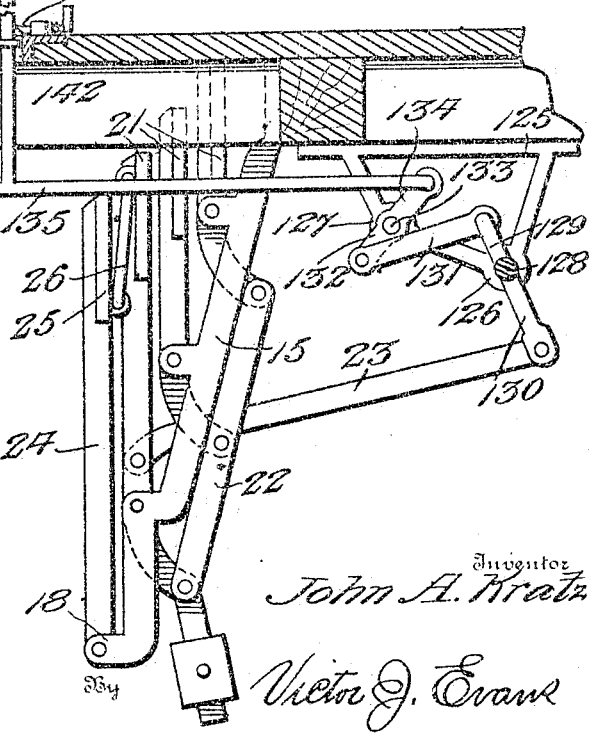
Witnesses
Edwin L. McKee
Chas. S. Hoyer
Inventor
John A. Kratz
By Victor J. Evans
Attorney

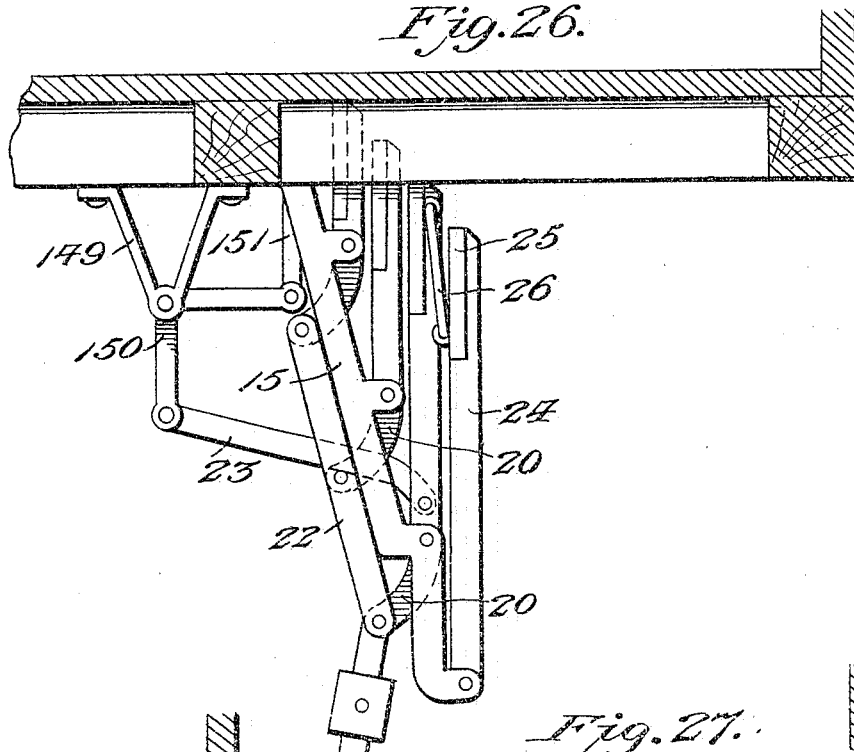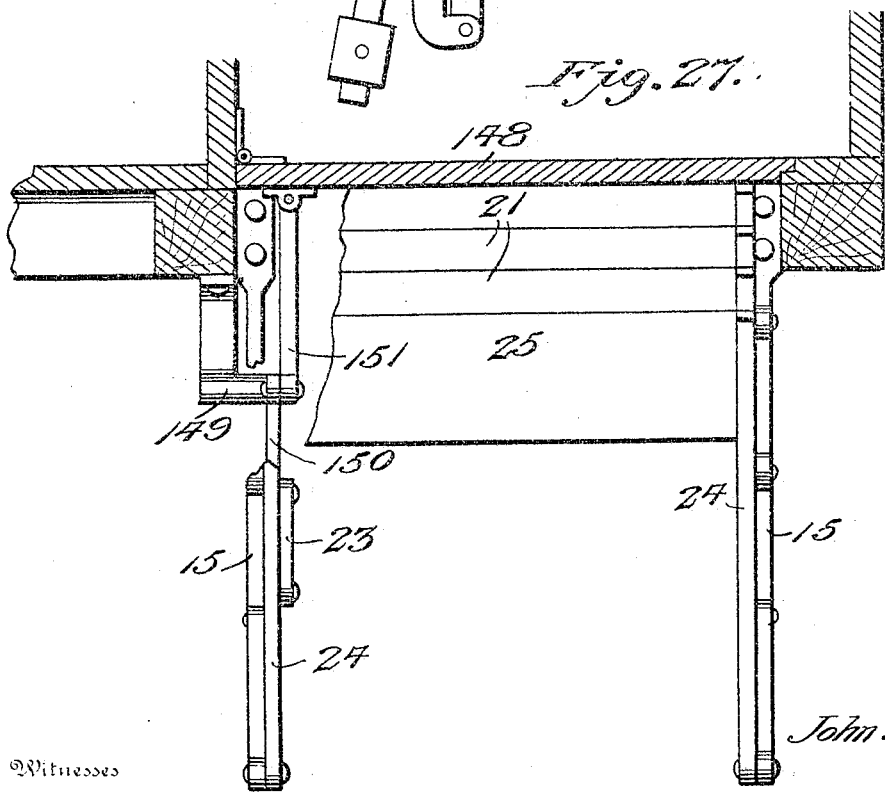

No. 775,366.

Patented November 22, 1904.

UNITED STATES PATENT OFFICE.

JOHN A. KRATZ, OF BALTIMORE, MARYLAND.

FOLDING CAR-STEP.

SPECIFICATION forming part of Letters Patent No. 775,366, dated November 22, 1904.

Application filed April 3, 1903. Serial No. 150,936. (No model.)

*To all whom it may concern:*

Be it known that I, JOHN A. KRATZ, a citizen of the United States, residing at Baltimore, in the State of Maryland, have invented new and useful Improvements in Folding Car-Steps, of which the following is a specification.

This invention relates to car-steps or running-boards of that type which may be folded and extended as exigency or convenience may require and particularly useful in instances where it is desired or required to position the steps to prevent use of them from the inner side of a track and in cases where it is necessary to fold them within the maximum projection of the side of the car-body or eave of the roof to prevent collision or contact with a passing vehicle.

As will hereinafter appear, the invention contemplates many modifications, all embodying the same or practically the same principle of operation and features of construction and devised to meet the demands of various car structures and operative by manually-controlled devices or the movement of a door or a platform extension in accordance with the style of car to which the improved car-step or running-board may be adapted and specially applicable.

The invention, broadly stated, comprises hanger means having supporting devices movably attached thereto to which are secured steps or running-boards, a connection between said supporting devices, and mechanism coöperating solely with one of the steps or running-boards to extend and fold the latter and all similar devices included in the organization, said mechanism being actuated from the platform or other part of a car through the medium of a shiftable element.

The invention further consists of hanger means having steps or running-boards movably held thereby, a permanent connection between the steps or running-boards, counterbalancing means for holding the steps or running-boards folded, and mechanism coöperating solely with one of the steps or running-boards and operative from a platform or other part of a car through the medium of a shiftable element to simultaneously fold or extend all of the steps or running-boards.

The invention further consists in the construction and arrangement of the several parts, which will be more fully hereinafter described and claimed.

The primary object of the invention is to simplify the construction and operation of folding and extensible car-steps or running-boards and render the movement of the contributing elements positive and without liability of jamming or becoming disarranged after continued use.

Figure 19:
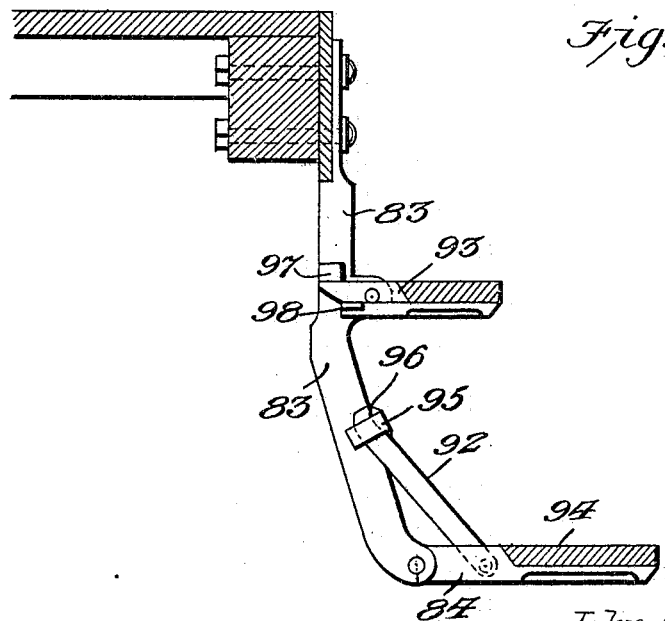

In the drawings, Figure 1 is a perspective view of complete step or running-board mechanism broken away in parts and showing it as in position to be attached to a car. Fig. 2 is a transverse vertical section through a portion of a car-bed and the step or running-board mechanism. Fig. 3 is a view similar to Fig. 2, showing a slight modification in the construction. Fig. 4 is a detail perspective view of a part of step or running-board mechanism embodying the features of the invention and showing a further modification in the mode of connecting the steps or running-boards and means for operating the same, the steps or running-boards being shown extended. Fig. 5 is a transverse vertical section through the devices shown by Fig. 4, illustrating the steps or running-boards folded and as applied to a part of the car-bed in dotted lines. Fig. 6 is a front end elevation of two of the steps or running-boards shown by Fig. 4 and illustrating a particular connection therefor. Fig. 7 is a detail perspective view of a portion of a car-step or running-board organization, showing a still further modification and illustrating the steps or running-boards as extended. Fig. 8 is a transverse vertical section through a part of the devices shown by Fig. 7. Fig. 9 is a transverse vertical section through a part of the devices shown by Fig 7, taken in a different plane. Fig. 10 is a front elevation of one of the hanger devices or members employed in the construction shown by Fig. 7. Fig. 11 is a plan view of one of the step or running-board supports shown by Fig. 7. Fig. 12 is a side elevation of a street-car, showing running-boards held in connection therewith and embodying a construction of operating devices and supporting means which may be any of those heretofore referred to or those hereinafter explained, but preferably that illustrated by Figs. 13 and 14 in slightly-modified form. Figs. 13 and 14 are transverse vertical sections through a portion of the car and running-board shown by Fig. 12 and respectively illustrating running-boards in extended and folded positions. Fig. 15 is a top plan view of a portion of the locking mechanism used in connection with the modified construction shown by Figs. 13 and 14 and embodied in Fig. 12. Fig. 16 is a top plan view of a fulcrum-support employed in the form of the mechanism shown by Figs. 13 and 14. Fig. 17 is a detail transverse vertical section showing a still further modification of the mechanism illustrated by Figs. 13 and 14. Fig. 18 is a detail perspective view of car-steps embodying a still further modification and particularly showing a reinforcing hanger-link for the bottom step. Fig. 19 is a detail transverse vertical section through a portion of a car-bed and intermediate part of running-boards, illustrating the application thereto of the reinforcing hanger-link shown by Fig. 18. Fig. 20 is a view similar to Fig. 19 and embodying hanger devices and running-board connections similar to the step connections shown by Fig. 18 and illustrating an intermediately-located counterbalancing-weight attachment. Fig. 21 is a detail perspective view of the running-board organization, illustrating further modified means for controlling the extension and folding of the same from the platform of a car. Fig. 22 is a sectional perspective view of a portion of a car having a door or entrance closure in the side thereof at an intermediate point or rear end of a platform and illustrating a still further modification in the arrangement of the mechanism for operating the steps leading to said door, the said mechanism being actuated to fold and extend the steps respectively by the closing and opening movements of the door. Fig. 23 is a sectional perspective view of a portion of a car, illustrating the mechanism shown by Fig. 2 as operative by a manual pull-rod, the steps in this instance being shown extended in full lines. Fig. 24 is a transverse vertical section of a part of a steam-railway vestibule-car, showing a still further modification in the organization of step-operating elements, and particularly illustrating means for actuating the steps by the movement of a door and for detaching the step-operating mechanism from the door, so that the latter can be used to connect vestibules of contiguous cars without operating the steps or allowing the latter to remain in folded condition. Fig. 25 is a view similar to Fig. 24, showing the steps folded. Fig. 26 is a transverse vertical section of a portion of an extension-vestibule of a car, showing the improved folding and extensible steps applied thereto. Fig. 27 is a longitudinal vertical section of the arrangement of parts shown by Fig. 6, a portion of the devices being broken away.

Similar numerals of reference are employed to indicate corresponding parts in the several views.

In many of the forms illustrated it will be perceived that the mechanisms at the ends of the steps or running-boards are of duplicate construction and that the intermediate mechanism, which may be one or more, is of similar construction, except that it is not connected to the operating-levers.

The duplications of parts will in the description be given like designations.

Referring to Figs. 1, 2, and 3, 1 designates hanger or supporting bars arranged at regular intervals and having their upper ends rigidly secured to the bottom side sill 2 of a car-bed and extending downwardly the proper length to suit the height of the lower step from the ground-surface. Pivotally fastened to the lower ends of the hanger or supporting bars are lower step or running-board bars 3, and at an intermediate point upper step or running-board bars 4 are also pivotally attached to the hanger or supporting bars 1. The step or running-board bars 3 and 4 extend in both directions from their pivotal supports, and on their forward or outward projecting extremities are secured steps or running-boards 5. The rear extremities of the step or running-board bars 3 and 4 are projected upwardly to reduce their downward projection when the steps or running-boards are folded and are connected by links 6, the rear extremities of the lower step or running-board bars being projected a greater distance than the upper ones and having weights 7, which act as counterbalancers and the gravity of which tends to assist in throwing or tilting the steps or running-boards in folding the latter and to maintain said steps and running-boards in folded position after the weights have descended to a certain point or plane.

It will be seen that the foregoing construction permits the steps or running-boards to be simultaneously projected or extended or likewise turned into folded or vertical position.

To the body of the car at determined points are pivotally secured bell-crank levers 8 in the form of triangular skeleton plates or frames and arranged to turn in a horizontal plane and formed with depending projections 9 at one of their angles. To the lower ends of the projections 9 the upper terminals of combined operating and supporting bars 10 are pivotally connected, the lower ends of the latter bars being also pivotally attached to the lower step or running-board bars 3 in advance of their pivotal points. The bell-crank levers 8 are also pivotally connected and the series thereof that may be employed united to a shifting rod 11, which project beyond the said bell-crank levers and are pivotally attached to primary operating bell-crank levers 12, having rods 13 pivotally attached thereto and extending to levers 14, which may be located at opposite ends of a car or at any other point desired.

The difference in construction shown by Figs. 1 and 2 and that illustrated by Fig. 3 consists in connecting the link 6 to different portions of the lower step or running-board bar 3 and a corresponding different application of the counterbalancing-weight in connection with each bar 3.

By operating either of the levers 14 the steps or running-boards may be folded or extended, and it will be understood that at the end of the route but one lever 14 need be operated to arrive at the result sought, so that the steps or running-boards may be folded at the inner side of the car and extended at the outer side.

Another difference of construction illustrated by Fig. 2 is that the hanger or supporting bars 1 are vertically straight and have intermediate angular projections 1ª, whereas the bars 1 shown by Figs. 1 and 2 are inclined outwardly and downwardly from the bed of the car. Both of these forms of hanger or supporting bars and the steps or running-boards coöperating therewith will be within the maximum projection of other portions of the side of the car.

In the form of the folding step or running-board just described two steps or running-boards are shown; but in the modification shown by Figs. 4 and 5 a series of four steps or running-boards are illustrated and therein each of the hangers 15 will for a greater portion of their length be projected outwardly at a downward angle of inclination and terminate in a lower angular elbow 16, continuing into a vertically-depending member 17 with a lower outwardly-projecting foot 18. The hanger-bar 15 in this instance also has outwardly-projecting horizontal lugs or ears 19, to which the step or running-board bars 20 are pivotally attached, as heretofore explained, and substantially of the same form, three of these bars 20 being used in this instance and having steps or running-boards 21, secured on their outer extremities. The rear terminals of the bars 20 are connected by a link 22, and the lowermost bar 20 has the lower end of a combined operating and supporting bar 23 pivotally attached thereto in advance of its pivotal point on the hanger-bar. To the outer end of the foot 18 a practically straight step or runner-bar 24 is pivotally attached and has a step or running-board 25 secured on its free extremity. The step or running-board 25 and its bar 24 are connected adjacent to one end to the step or running-board 21 next above by a movable link 26, so that when the steps or running-boards 21 are folded or extended by actuating the operating-bar 23 the said lower bar 24 and its running-board or step will be correspondingly moved, and by this means four steps or running-boards may be operatively included in the improved organization to accommodate car-beds arranged at a considerable elevation above the surface. The link 26 is held in movable connection with the upper surface of the step or running-board 25 and the lower surface of the step or running-board next above by clips 27, which will be suitably fastened. The upper end of the operating-bar 23 is secured to a depending projection 28 of a bell-crank lever 29, similar in construction to the bell-crank lever 8, heretofore described. The bell-crank lever 29 has an upstanding stud or pin 30 at the angle thereof opposite that from which the projection 28 depends, and said stud or pin engages a slotted lug or ear 31 projecting outwardly at a right angle from a shifting rod 32, which will connect with the entire system or series of operating-bars 23, disposed at regular intervals under and along the sides of the car-bed, if found necessary, or, as in the arrangement shown by Fig. 1, the bell-crank levers 29 will be located only at opposite sides of the car-bed. The shifting rod 32 is connected to a piston (not shown) in a compressed-air cylinder 33, fed through a pipe 34 with compressed air from a suitable source of compression, and when the steps or running-boards are used in connection with cars having air or pneumatic brake systems the said cylinder 33 will be included as a part of such system.

It will be appreciated that the operation of the modified construction shown by Figs. 4, 5, and 6 is similar to that shown by Figs. 1, 2, and 3, and the movement of the rod 32 in opposite directions will control the folded or extended condition of the steps or running-boards 21 and 25.

Figs. 7, 8, 9, 10, and 11 illustrate a still further modification not only in the arrangement of the hanger-bars and step or running-board bars, but also in the means for primarily shifting the main operating devices to actuate the operating-bars. In this still further modified form each of the hanger-bars 35, as clearly shown by Figs. 8 and 10, has an intermediate longitudinal slot 36 and a lower bifurcated end 37 for the application and pivotal securement of upper and lower step or running-board bars 38 and 39, it being obvious that if more than two step or running-board bars be used the number of slots 36 may be increased correspondingly. At the upper terminal of each slot 36 are opposite fulcrum-hooks 40, and at the lower end of the hanger-bar similar fulcrum-hooks 41 project outwardly from the opposite members guarding the bifurcation. The hooks 40 and 41 are open at their upper portions, and the step or running-board bars 42, as clearly shown by Fig. 11, at intermediate points have oppositely-projecting trunnions 43 to removably fit in the hooks 40 and 41, respectively. The step or running-board bars 42 project rearwardly beyond the hanger-bars 35, as in the constructions heretofore set forth, and are detachably connected by a link 44, and on the front extremities of the bars 42 steps or running-boards 45 are secured. The lower end of an operating-bar 46 is attached to the lower bar 45 in advance of the fulcrum-point of the latter, and the upper end of said bar 46 is pivotally secured to a depending projection 47 of a triangular frame or bell-crank lever 48, similar to the levers 8 and 29 heretofore explained. The parts of this form of the step or running-board organization are intended to be constructed and assembled in such manner that they may be readily detached to entirely remove the steps or running-boards at any time desired or found necessary. The operations of folding and extending the steps or running-boards in this instance are similar to those effected in the forms heretofore described; but the primary shifting means is varied and consists of a transversely-extending rocking bar 49, located at each end of a car and supported at the center by a fulcrum-plate 50. On opposite extremities of the bar 49 are upstanding posts 51, having upper tread-heads 52, upon which the motorman, driver, or other attendant disposes his foot to shift the bell-crank lever 48 and fold or extend the steps or running-boards, and secured to one end of the rocking bar 49 is a shifting cable 53, movable over a guide sheave or pulley 54 and attached to the angle of the bell-crank lever 48 between the fulcrum of the latter and the depending projection 47. When the rocking bar 49 is in horizontal position, the steps or running-boards will be extended, as shown by Fig. 7, and by pressing downwardly on the posts 51 at the end of said rocking bar distant from the point of attachment of the cable 53 thereto a drawing tension will be exerted on the cable 53 toward the rocking bar and actuate the bell-crank lever 48 and actuating-bar 46 in such manner that the steps or running-boards 45 will be drawn upwardly or folded.

Fig. 12 shows a pair of steps or running-boards embodying the features of the invention applied to the full length of a car 55 and the position of primary shifting levers at opposite ends of the car to control the folding and extended positions of the said steps or running-boards. The mechanism for arriving at the result sought may be either of the forms heretofore explained or those which will be hereinafter referred to, but is preferably the organization of elements clearly shown by Figs. 13, 14, 15, and 16 and in slightly-modified form shown by Fig. 17. The hanger-bars 56 in this instance, as well as the step or running-board bars 57, steps or running-boards 58, connecting-link 59 for the bars 57, and operating-bar 60 are each similar to the hanger-bar 1 illustrated by Figs. 1 and 2, as well as the corresponding parts in the latter figures. The hanger-bar 61 (shown by Fig. 17) is constructed with an angular bend 62 to accommodate the application of three steps or running-boards 58 instead of two of the latter devices, as shown by Figs. 13 and 14, and the running or step boards 58 are let into the outer extremities of the bars 57, the latter being recessed for this purpose, as clearly shown by Figs. 13, 14, and 17. The bell-crank lever 63 is similar in this modified construction to those heretofore described, and this modification shows means for locking the primary shifting lever and comprises a connecting-rod 64, attached to the bell-crank lever 63 and pivotally connected to the lower end of a shifting lever 65, having a handle 66 secured thereon. The lever 65 projects upwardly through a fulcrum-support 67, having an upwardly-extending slotted member 68 let into a socket 69 in the bed of the car, the slot 70 of the member 68 coinciding with a slot 71 in the floor of the platform or other part of the car-bed and also with a plate-slot 72 in a securing or holding plate 73, having guards 74 on opposite sides of the slot 72 and a toothed catch-bar 75 in advance of the said slot 72. The catch-bar 75 is formed with two catch projections or teeth 76, and surrounding the outer end of the catch-bar is a guide-shoe 77, having an outer upwardly-flared end 78. The lever 65 has a catch-link 79 movably attached thereto to loosely pass over the teeth 76, and if the lever is suddenly forced outwardly its full length the catch-link 79 will be prevented from becoming disengaged from the catch-bar by the upwardly-flared extremity of the shoe 77. When the lever 65 is thrown inwardly, as shown by Fig. 13, and the catch-link 79 rests loosely on the guards 74, the steps or running-boards will be extended in operative position. When the lever 65 is thrown outwardly, as shown by Fig. 14, and the catch-link 79 caused to engage one of the teeth 76, the steps or running-boards will be drawn upwardly in folded position and so held reliably against accidental outward movement into extended position. In the form of the device shown by Fig. 17 and included in the modification illustrated by Figs. 13 and 14 three steps or running-boards are shown having their bars 57 movably attached to a single link, and the operating-bar 60 in this instance is movably secured to the middle or intermediate step or running-board bar and also movably attached to the bell-crank lever 63. The link 80 (shown by Fig. 17) makes it possible to simultaneously fold and extend the upper and lower steps or running-boards of the series of three of the latter, shown, through the medium of the operating-bar 60, connected to the middle or intermediate bar 57. The catch or holding mechanism illustrated by Figs. 13 and 14 will be used in connection with the organization of elements shown by Fig. 17, or, if desired, the counterbalancing-weights shown by Figs. 1 and 2 may be employed and carried by the lowermost bar 57. The further modified organization shown by Figs. 13, 14, and 17 will have shifting means attached to the bell-crank lever 63, similar to either of the forms heretofore explained.

Fig. 18 shows a still further modification including two steps 81 and 82, carried by hanger-bars, and step-bars similar to those heretofore described and numbered or designated by numerals 83 84, respectively, and having an operating-bar 85 connected to the lower step-bar 84 in advance of the fulcrum of the latter. The upper end of the bar 85 is movably attached to a depending arm 86 of a rock-shaft 87, held in hangers or bearings 88, secured to the under side of the car-bed. At one end the rock-shaft 87 connects with the center of a rock-bar 89, having upstanding posts 90 at opposite ends, with pressure-heads 91, by which the rock-shaft may be moved in opposite directions to respectively fold and extend the steps 81 and 82. The same structure or combination of elements disclosed by Fig. 18 will be applied at the opposite extremities of the running-board assemblage shown by Fig. 19, and the steps illustrated by Fig. 18, as well as the folding running-boards illustrated by Fig. 19, have reinforcing hanger-links 92, one of said links being used in connection with the steps 81 and 82 and a number of such links employed in connection with the running-boards 93 and 94 (shown by Fig. 19) and arranged at regular intervals to brace the lower running-board and resist strain imposed thereon. Each of the links 92 is pivotally attached to the lower bar 84 and slidably engages a guide-loop 95, secured to the adjacent side of the hanger 83 nearest the lower bar 84. The guide-loop is disposed at a proper angle of inclination to accommodate the movement of the link 92 therethrough, and the upper end of the latter has an angular deflection 96 to engage the upper edge of the loop 95 when the lower step 82 or lower running-board 94 has been fully extended in horizontal position to prevent said step or running-board from being depressed below a normal horizontal plane. The upper running-board 93 (shown by Fig. 19) may also be braced at determined points intermediate of its ends by lugs or shoulders 97, formed on or secured to one side of the several hangers intermediate the end ones, and the running-board bar of the upper running-board 93 at points between the opposite end hangers may also be provided with stops 98 at regular intervals to engage the front portions of the lugs or shoulders 97 to limit the inward movement of the said upper running-board when folded and relieve the operating devices of considerable strain. It will be understood that the section shown by Fig. 19 is taken through the running-boards at a distance from the operating mechanism at opposite ends, and hence said mechanism does not appear in this figure.

Fig. 20 illustrates means for counterbalancing running-boards embodying the features of the invention and having considerable length at different points between the ends thereof and consists in attaching a wire or small cable or other analogous device 99 to the lower running-board bar pivoted to the hanger and running such wire or cable upwardly over a grooved sheaf or pulley 100, secured to the under portion of the car-bed, and attaching thereto a counterbalancing-weight 101, the wire or cable also engaging a guide sheave or pulley 102 at an intermediate point and on one side of the adjacent hanger. This counterbalancing mechanism operates to assist in folding and maintaining in folded condition the running-boards and overcomes the necessity for a motorman or operator to exert unusual effort in folding the running-boards on a long car and renders the operation of controlling an increased weight comparatively easy. By having the hanger in contact with the wire or cable 99 through the medium of the guide sheave or pulley 102 inner straining pressure exerted on the hanger is resisted, in view of the fact that the said wire or cable bears against the rear part of the sheave or pulley 102. Other parts of the structure shown by Fig. 20 will be similar to that heretofore explained.

Fig. 21 shows a duplicate of the construction shown by Fig. 1 so far as the hanger-bars, running-board bars, and connecting-links are concerned; but in this instance the operating-bars 10, heretofore explained, are eliminated, and in lieu thereof wires or small cables 103 are connected to the lower running-board bars at points intermediate the ends of the latter and engage angularly-disposed guide-sheaves 104, suitably secured to the under side of the car-bed, and connect with a main pull cable or wire 105, which has its one extremity passed over a guide-sheave 106 and extended downwardly to the lower running-board bar at one end of the running-board assemblage. The opposite end of the main cable 105 is secured to one arm of a bell-crank lever 107, suitably mounted underneath the bed of a car and having its opposite arm attached by a connecting-rod 108 to a shifting lever 109. By actuating the bell-crank lever 107 in opposite directions through the medium of the shifting lever 109 the main cable 105 and the wires or cables 103 attached thereto will alternately have a pulling tension exerted thereon to fold the running-boards in connection therewith or be permitted to slacken sufficiently to cause the running-boards to assume a normal extended position.

Figs. 22 and 23 illustrate a still further modification of the invention to render the same applicable to street-cars or other vehicles having a door in the side thereof at an intermediate point or in some instances at either one or both ends of a car, Fig. 22 particularly showing means for operating the mechanism by the sliding movement of the door without direct manual actuation and Fig. 23 showing means for manually actuating the mechanism independent of the movement of the door. In Figs. 22 and 23 four steps are shown; but these may be reduced in accordance with the height of the bed of the car above the surface, and as the arrangement of the steps, hanger-bars, step-bars, and operating-bar connected to one of the step-bars is practically the same as that illustrated by Fig. 4 special reference to the details will not be made in connection with these further modifications; but only such parts will be specifically described as constitute the modification and adapt the assemblage (clearly shown by Fig. 4) to an intermediate door or a door at either one or both car ends. A triangular bell-crank lever 110 is used in this instance and practically the same as the similar device heretofore described, with the exception that in addition to the depending projection 111, to which the operating-bar is attached, it has a depending projection 112 at the opposite angle, to which a link 113 is pivotally secured and also movably attached to a shifting lever 114, extending upwardly through a slot 115 in the bed of the car and fulcrumed at an intermediate point against the inner side of a sill 116 below the car-bed. The upper end of the shifting lever 114 extends a considerable distance above the upper surface of the floor of the car and loosely projects through an elongated loop rigidly secured to the inner side of the lower portion of the car-door 116, as at 117, the said loop having right-angular terminals 118 to strike against or contact with the upper end of the shifting lever 114. When the door 116 is closed, the one terminal 118 strikes the end of the lever and shifts the same toward the right and actuates the bell-crank lever 110 in such direction as to fold the steps. When the door is open, the opposite terminal 118 engages the shifting lever 114 and reversely moves the coöperating mechanism to extend the steps, as shown by dotted lines in Fig. 22. Instead of the triangular bell-crank lever 110 (shown by Fig. 22) a vertically-disposed common form of bell-crank lever 119 is used in connection with the mechanism shown by Fig. 23 and held by a hanger 120, depending from the car-bed. The bell-crank lever 119 has a long and a shorter arm, and movably attached to the terminal of the longer arm thereof is a pull-rod 121, which extends upwardly through an opening 122 in the bed of the car close to the door 116. The longer arm of the bell-crank lever 119 when in normal position and the steps extended is disposed in a horizontal plane, and the shorter arm depends vertically and is movably connected to the upper end of the operating-bar attached to one of the step-bars. When the door 116 is closed, the conductor or other operator elevates the pull-rod 121 and throws the longer arm of the bell-crank lever 119 upwardly and the shorter arm thereof downwardly, thereby extending the step. When the door 116 is opened, the operator depresses the rod 121 and reversely moves the bell-crank lever 119 to exert an inwardly-drawing movement on the operating-bar connected to one of the step-bars to fold the steps and dispose the coöperating mechanism directly related to the steps in the position shown by Fig. 22. The organization shown by Figs. 22 and 23 has brace-rods 123 and 124 connected to the lower extremities of the hangers and to the under side of the bed of the car to relieve the step organization, and particularly the hangers, of inward strain and remove all tendency of bending the said hangers by an extra weight imposed on the steps. These braces will also be used in connection with all the other forms when found necessary, particularly in heavy step or running-board structures.

Figs. 24 and 25 show the improved folding step devices applied to and operative in connection with a vestibule-car for steam-railways, the extension and folding movements of the steps being respectively obtained by opening and closing the door of the vestibule and having means whereby the step-operating devices may be detached from the door, so that the latter may be opened and closed without affecting the step organization. In this modification the hangers and step-bars, as well as the operating-bar attached to one of the hangers, are similar to the constructions heretofore described and will not be specifically set forth. To the under side of the car-bed a hanger 125 is secured and has two bearing-eyes 126 and 127 therein, the hanger being duplicated at a distance from that shown equaling approximately the length of the steps. A rock-shaft 128 is rotatably mounted in the eyes 126 of the two hangers and has an upwardly-extending short arm 129 and a lower longer arm 130. The longer arm 130 is movably attached to the upper end of the operating-bar connected to one of the step-bars, and the shorter arm 129 is movably attached to the rear end of a link 131, extending to a lower arm 132 of a rock-shaft 133, mounted in the eyes 127. The rock-shaft 133 also has an arm 134 diametrically opposed to the arm 132, and to the free end thereof the rear end of a shifting rod or element 135 is movably attached and extends forwardly under the vestibule-platform and has its outer end angularly bent, as at 136, and detachably disposed in a lower crank-arm 137 of a turn-post 138, depending through the platform and connected to the vestibule-door. As shown by Fig. 24, the post 138 extends upwardly through the vestibule-platform 139 on the other side of a floor or bed beam 140, and said post is attached to the lower edge of the door adjacent to one corner and will be permitted ample arcuate movement in the floor of the vestibule to compensate for the opening and closing movements of the door, as shown by dotted lines in Fig. 24. The shifting rod or element 135 is slidably held in a guide-strap 141, secured to the under side of the flooring or bed of the vestibule, and connected to said rod is a detaching-rod 142, which projects upwardly through a slot 143 in the vestibule flooring or bed and terminates at its upper end in a grip 144. The slot 143 is surrounded by a wear-plate 145, and on the detaching-rod 142 is a stop collar or shoulder 146, which is adapted to be engaged by a spring-actuated locking catch or bolt 147 to prevent the rod from being drawn upwardly under normal conditions. The purpose of the rod 142 is to detach the rod 135 from the crank 137 at the lower end of the post 138 to permit the door of the vestibule to be opened and closed without affecting the steps and the mechanism cooperating therewith after said steps have been folded during movement of the car or when the car is at a standstill and passengers pass to and fro from the car and alternately open and close the door when the steps are extended. When the rod 135 is detached from the crank-arm 137, the steps will remain folded in view of the fact that they have a counterbalancing-weight attached thereto or coöperating therewith of the same nature as the weights heretofore explained.

In the operation of the modification shown by Figs. 24 and 25 the crank-arm 137 of the post 138 will be thrown outwardly when the vestibule-door is open, and the shifting rod or element 135 will be moved in the same direction and pull forward on the arm 134 of the rock-shaft 133 and throw the arm 132 thereof rearwardly and simultaneously move the link 131 in a rearward direction and operate the rock-shaft 128 in such direction through the arm 129 thereof that the arm 130 will be moved outwardly and push the operating-bar outwardly and extend the steps. When the door of the vestibule is closed, a reverse movement ensues and the steps are folded, as clearly shown by Fig. 25. When the shifting rod or element 135 is moved outwardly, the detaching-rod 142 is shifted in the same direction away from the bolt or catch 147, so that a detachment of the shifting rod 135 from the crank-arm 137 may be readily attained without operating the bolt or catch 147. When the steps are folded and the shifting rod or element 135 is moved backwardly by an inward throw of the crank-arm 137, the detaching-rod 142 is located adjacent to the inner end of the slot 143 close to the bolt or catch 147, as clearly shown by Fig. 25, and when the parts are in this position it is necessary to operate or retract the said bolt or catch in order to permit the rod 142 to be drawn upwardly to disconnect the rod 135 from the crank 137.

Figs. 26 and 27 illustrate a still further modification relating to the use and application of the steps to what is known as an "extension-vestibule" for observation-cars and the like. In this class of vestibule-cars there is usually a hinged trap-board 148 to close downwardly over the step-opening when the car is in motion or transit to extend the floor-space. The opening and closing movements of the trap or closing board 148 are utilized in the present modified construction to respectively extend and hold the steps, and as the hangers, step-bars, and connecting-link therefor and steps, as well as the actuating-bar and counter-poise or counterbalancing-weight attachment are the same as shown by Figs. 24 and 25 and heretofore specifically described, they will not be explained in detail in connection with this latter modification. Secured to the under side of the extension-vestibule platform is a fulcrum means 149, which includes a bell-crank 150, having the operating-bar for the steps movably attached to the lower arm thereof and the upper arm connected by a link-bar 151 with the trap-board or floor-closure 148. When the trap-board 148 is lowered or closed, the bell-crank lever 150 assumes a position shown by Fig. 26 and the steps and coöperating elements are closed. When the said trap-board is elevated to clear the step-opening, the upper arm of the bell-crank lever 150 is drawn upwardly and the lower arm turned outwardly, and the operating-bar is also forced outwardly and the steps extended.

In the several modifications heretofore set forth, as well as the construction shown by Figs. 1 and 2, it will be seen that the hangers to support the step-bars and steps, as well as the running-boards, are constructed in such manner as to avoid an outward projection thereof as much as possible or a projection fully within the regulation governing both street and railway car constructions. Moreover, the improvements set forth clearly disclose means for applying a number of folding steps or running-boards and extending the latter within the confines of the regulated distance prescribed by railroad companies to accommodate car-beds having a differentiation in elevation above the surface, so that passengers may conveniently enter or alight from a car. It will also be seen that all the forms disclosed have common features of construction within the step or running-board organization itself and that various primary operating means, as well as shifting devices, may be utilized for folding and extending the steps or running-boards.

Having thus fully described the invention, what is claimed as new is—

1. In a folding car-step or running-board organization, the combination with a car, of hanger means secured to the car side and having an outward projection within prescribed regulation limits, separate step means movably attached to said hanger means and having portions extending inwardly beyond the said means and directly connected for simultaneous folding and unfolding operations, the step means, when folded, being disposed vertically, and primary actuating devices for controlling the folding and unfolding movements of the step means.

2. In a folding car-step or running-board organization, the combination of hanger devices secured to the car side at intervals and having an equal outward projection within prescribed regulation limits, the said hanger devices being rigid throughout their length, two or more car-step or running-board supporting means pivotally attached to said hanger devices and having portions extending inwardly beyond the said hanger devices and directly connected for simultaneous operation, an operating element pivotally attached to one of the supporting means in advance of the fulcrum thereof, and primary actuating mechanism to which the said element is pivotally connected.

3. In a folding car-step or running-board organization, the combination of hanger devices secured at regular intervals to the car side and having an outward projection within prescribed regulation limits, the said hanger devices being rigid throughout their length, two or more car-step or running-board supporting means pivotally attached to, and movable inwardly toward and outwardly from, the said hanger devices and connected for simultaneous operation, a counterbalancing-weight attached to a part of the supporting means, an operating element pivotally secured to one of the supporting means in advance of the fulcrum thereof, and primary actuating mechanism to which the said element is pivotally connected.

4. In a folding car-step or running-board organization, the combination with hanger devices, two or more car-step or running-board supporting means pivotally attached to said devices and projecting rearward beyond the latter, connecting members pivotally secured to the rear ends of the supporting means, an operating element pivotally attached to one of the supporting means in advance of the fulcrum thereof, and primary actuating mechanism to which the said element is pivotally connected.

5. In a folding car-step or running-board organization, the combination with hanger devices, two or more car-step or running-board supporting means pivotally attached to said devices and projected in rear of the latter, connecting members pivotally secured to the rear ends of the supporting means, an operating element pivotally attached to one of the supporting means in advance of the fulcrum thereof, and lever mechanism operative from the bed or platform of a car and connected to the said element.

6. In a folding car-step, the combination of hanger devices rigid throughout their length, two or more car-step or running-board supporting means pivotally attached to said hanger devices and carrying steps or running-boards, portions of said means projecting inwardly beyond the hangers, connecting devices pivotally and directly attached to the portions of the car-step or running-board supporting means extending inwardly beyond the hangers, and mechanism for folding and extending the supporting means and connected to the extended portions of the latter.

7. In a folding-step construction for cars, the combination of hanger devices, step-supporting means pivotally secured to said hanger devices and foldable in relation to the latter, and a counterbalancing means secured to and operating with a part of the step-supporting means.

8. In a car-step construction, the combination of hanger devices, two or more car-step-supporting means pivotally connected and foldable in relation to said hanger devices, and counterbalancing means secured to a part of the said step-supporting means.

9. In a car-step construction, the combination of hanger devices rigid throughout their length and having portions thereof vertically straight and the remaining portions outwardly deflected at an angle of inclination within prescribed regulation limits, and step means pivoted to the hanger devices and foldable inwardly toward and outwardly from the latter.

10. In a car-step construction, the combination of hanger devices having portions thereof vertically straight and the remaining portions outwardly deflected at an angle of inclination, the hanger devices being rigid throughout their lengths and having an outward projection within prescribed regulation limits, and foldable step-supporting means pivotally attached to the hanger devices and projectable from the latter in horizontal planes, said step-supporting means gradually increasing in outward extent toward the lower terminals of the hanger devices.

11. In a car-step construction, the combination of hanger devices rigid throughout their entire lengths and projecting outwardly from the car side within prescribed regulation limits, car-step-supporting means pivotally connected to said devices and foldable in relation thereto, said car-step-supporting means being gradually projected toward the lower terminals of the hanger devices and carrying steps which are movable in vertical position with relation to the hanger devices, and reinforcing devices connected to a part of said supporting means and held in movable engagement with a portion of the hanger devices.

12. In a car-step construction, the combination of fixed hanger devices rigid throughout their lengths and projected at their lower extremities outwardly beyond their upper terminals, steps foldably supported by said hanger devices, the latter having guide means thereon, and a reinforcing-link connected at one terminal to one of the said steps and slidable through the guide means in close relation to a part of the hanger devices.

13. In a folding car-step or running-board organization, the combination of immovably-secured hanger devices having portions thereof vertically straight and the remaining portions outwardly deflected at an angle of inclination, two or more car-step or running-board means pivotally attached to said devices and connected for simultaneous operation, an operating element pivotally attached to a part of the supporting means, and primary actuating mechanism to which the said mechanism is movably attached.

14. In a folding car-step or running-board organization, the combination of immovably-secured hanger devices having portions thereof vertically straight and the remaining portions outwardly deflected at an angle of inclination, two or more car-step or running-board supporting means movably attached to said devices and connected for simultaneous operation, whereby the movement of one step or running-board will correspondingly move the other, and an operating element pivotally attached to one of the supporting means.

15. In a folding car-step or running-board organization, the combination of immovably-secured hanger devices, the latter being rigid throughout their lengths, two or more car-step or running-board bars movably attached to said hanger devices, a connecting element for all of said bars whereby the movement of any one of the latter will correspondingly operate the others, and an operating element pivotally connected to one of the bars.

16. In a car-step or running-board organization, hanger devices, step-supporting means pivotally held by said devices, mechanism for operating the said step-supporting means to fold and extend the latter, and means for disconnecting a part of the said mechanism to permit the steps to remain extended or folded.

17. In a car-step construction, the combination with a vestibule having a door, hanger devices arranged in operative relation to said vestibule, said hanger devices being immovably secured to the car and rigid throughout their entire lengths, folding steps carried by the said hanger devices, all of the steps being movable on the said hanger devices, mechanism for operating the steps, and means attached to the door and connected to the said mechanism for folding or extending the steps.

18. In a car-step organization, the combination with a car having a vestibule provided with a movable means to permit access to the steps, of immovably-secured hanger devices rigid throughout their entire length, folding car-steps operatively disposed on the hanger devices and providing means for entering and passing out from the vestibule, mechanism for folding and extending the said steps, and devices between the said means for giving access to the steps and the mechanism for folding and extending the steps, whereby the steps may be folded or extended in accordance with the closed or open condition of the said means giving access to the steps.

In testimony whereof I affix my signature in presence of two witnesses.

JOHN A. KRATZ.

Witnesses:
   JESSIE A. KING,
   GEORGE M. BOND.